Oct. 22, 1957 A. V. WEASLER 2,810,274
PHASE-CONTROLLED, TELESCOPICALLY EXTENSIBLE
SHAFT FOR CONNECTING TWO UNIVERSAL JOINTS
Filed March 14, 1955
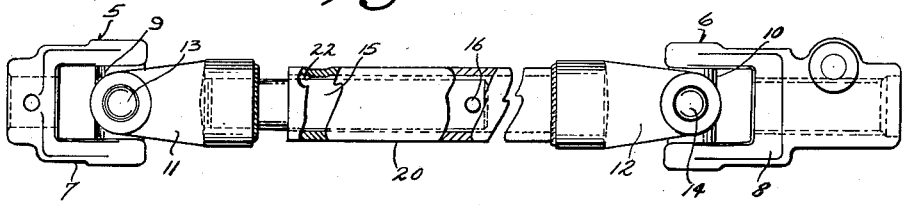
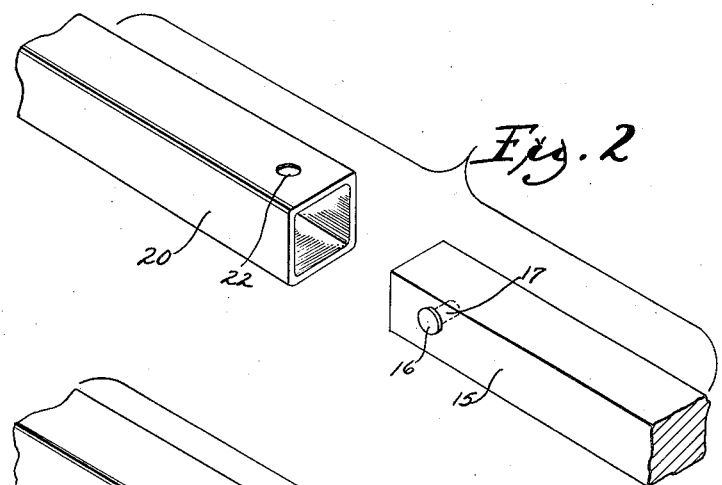
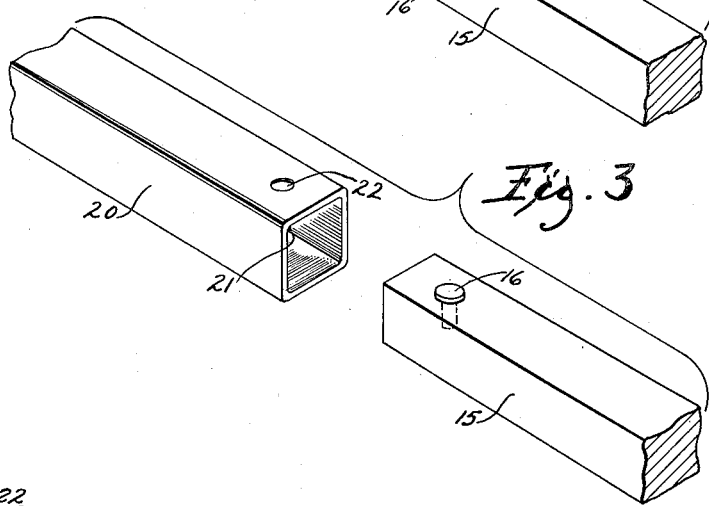
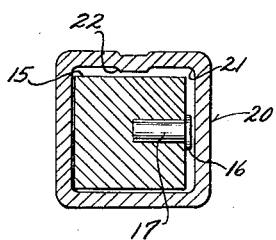
INVENTOR.
ANTHONY V. WEASLER
BY
Wheeler, Wheeler & Wheeler
ATTORNEYS

United States Patent Office 2,810,274
Patented Oct. 22, 1957

2,810,274

PHASE-CONTROLLED, TELESCOPICALLY EXTENSIBLE SHAFT FOR CONNECTING TWO UNIVERSAL JOINTS

Anthony V. Weasler, West Bend, Wis.

Application March 14, 1955, Serial No. 494,108

6 Claims. (Cl. 64—1)

This invention relates to a phase-controlled, telescopically extensible shaft for connecting two universal joints.

In order that a pair of universal joints can operate satisfactorily at relatively high speeds without excessive vibration, it is necessary that the joints be maintained in phase in the sense that their corresponding pintles occupy corresponding angular positions. To achieve this result in a simple and effective manner is the object of the present invention.

In order to constrain the telescopically extensible shaft sections to rotate with each other, one of them comprises a square bar and the other a tube of generally square cross section, the corners of which may be slightly rounded. According to my invention, means is provided whereby the exterior of the bar has a protuberance projecting from one of its faces while the interior of the tube has a projection extending inwardly from one of its faces. The dimensions of the tube and the bar differ sufficiently so that the tube and bar may readily be assembled telescopically when the respective projections are offset from each other by 90°. However, assembly is impossible if the tube and the bar have their respective projections in the same plane, whether the respective projections are in the same angular position or are 180° offset.

While the invention is exemplified on shaft elements which are substantially square in cross section, it is also applicable to telescopically related shaft elements of other polygonal contours.

In the preferred embodiment shown, the outward protuberance on the bar is provided by the head of a pin driven into the bar, while the inward protuberance on the square tube is conveniently made by embossing inwardly a portion of the tube side wall.

In the drawings:

Fig. 1 is a plan view of an assembly comprising two universal joints and an intervening telescopic shaft embodying the invention, portions of the elements comprising the shaft being broken away.

Fig. 2 is a view showing in perspective and in relatively separated positions the component shaft element oriented for assembly in accordance with the present invention.

Fig. 3 is a view similar to Fig. 2 but showing the shaft elements incorrectly oriented in such a way that assembly is made impossible.

Fig. 4 is a view taken in cross section through telescopically assembled shaft elements in one of the two positions of relative angular association in which they may properly be united.

There are two universal joints shown at 5 and 6, respectively. These comprise yokes 7 and 8, center cross elements 9 and 10 and yokes 11 and 12, respectively. The center cross elements conventionally provide pintles or trunnions at right angles to each other engaged with the arms of the respective yokes. These are exemplified in Fig. 1 by the pintle studs 13, 14 of the cross members 9 and 10 which are engaged with yokes 11 and 12 attached to opposite ends of the telescopically extensible shaft assembly. The purpose of the present invention is to make sure that the axes of the studs 13, 14 will remain parallel in the assembled position of the shaft elements.

Connected with one of the yokes, as for example yoke 11, is the bar 15 which, for the purposes of the present disclosure, has a polygonal cross section which is square. Near its end remote from the yoke 11, the shaft element 15 is provided with a protuberance 16 projecting from one of its faces. This is conveniently provided by drilling a hole into the bar and driving into it a headed pin 17, the head of which, on the face of the bar, provides the protuberance 16.

Connected with a yoke of the universal joint at the other end of the telescopic shaft as, for example, the yoke 12 of Fig. 1, is a shaft element comprising a sleeve 20 which may correspond in polygonal cross section to the bar 15 but is somewhat larger. Moreover, whereas the bar is conveniently provided with sharp corner edges, the corners 21 of shaft element 20 may be somewhat rounded.

At the end of the shaft element 20 which is remote from the universal joint yoke 12 to which it is attached, there is provided an inwardly projecting protuberance 22 which may conveniently be made by embossing the metal inwardly as clearly appears in Figs. 1 and 4. The internal cross section of the shaft element 20 is sufficiently greater than the external cross section of shaft element 15 so that there is ample clearance to accommodate the boss 16 of shaft element 15 and the boss 22 of shaft element 20 provided these are disposed in different planes. In shaft elements of the construction illustrated, this requires that the bosses of the respective shaft elements be angularly offset 90° in one direction or another from positions of registry. Thus, if the boss 16 is 90° offset to the left of boss 22 in the position shown in Fig. 2, the shaft element can readily be assembled. The same is true if the boss 15 is offset 90° to the right of boss 22 as shown in Fig. 4. However, if the two bosses are in the same plane, being either at the same side of the telescopic shaft, as in Fig. 3, or in diametrically opposite positions, in either such case it will be impossible to assemble shaft sections.

By simply connecting the yokes 11 and 12 to the respective shaft sections in such a manner that the bearings for pintle studs 13, 14 will be parallel when the respective bosses 16 and 22 are angularly offset by 90°, the correct phasing of the universal joints is assured. Since the telescopic shaft elements are readily assembled and disassembled by the user, whereas the connection of the universal joint yokes therewith is permanent, the invention herein disclosed makes it possible for the manufacturer to protect his product from improper assembly in the field.

In practice, the internal boss 22 and the external boss 16 each project from the contiguous surfaces of their respective shaft elements by approximately one-thirty-second of an inch and the clearance provided for them is approximately the same. Accordingly, in practice, there is little or no side play in a telescopic shaft embodying the invention and the phase lock provided as herein disclosed assures substantially vibration-free operation.

I claim:

1. A phase control apparatus comprising the combination with inner and outer shaft elements of corresponding polygonal cross sectional shape and of dimensions providing clearance between angularly related faces, of means providing an outwardly projecting protuberance on the inner of said elements, and means providing an inwardly projecting protuberance on the outer of said elements, the said protuberances substantially corresponding in height to the clearance between the said faces of said elements and the said protuberances being angularly offset in the properly phased relationship between said elements and adapted to interfere with assembly of said elements in an improperly phased angular position thereof.

2. The device of claim 1 in which each of said elements has its respective protuberance at a point remote from the end of such element which is connected with a universal joint.

3. In a shaft assembly comprising a pair of spaced universal joints and a pair of telescopically associated shaft elements connected with respective joints for locking the respective joints in proper phase relationship, the improvement which consists in the combination with a substantially square bar comprising one of said shaft elements, of a substantially square tube comprising the other of said shaft elements and of internal cross section materially greater than the external cross section of the bar, the bar having a protuberance projecting outwardly from one of its faces at a point remote from the joint with which it is connected and the tube having a protuberance projecting inwardly from one of its faces at a point remote from the joint with which it is connected, the respective protuberances being offset 90° in the assembly of the tube and the bar and having a combined projection exceeding clearance between the bar element and the tube element whereby to preclude assembly of the bar element and the tube element when said protuberances are in the same plane.

4. The device of claim 3 in which the protuberance projecting inwardly from the tubular shaft element is disposed between the protuberance of the bar and the universal joint with which the bar is connected, the protuberance projecting from the bar being intermediate the protuberance of the tubular shaft element and the universal joint with which the latter element is connected.

5. The device of claim 4 in which the protuberance of each such shaft element has a bearing surface operatively engaged with the other shaft element, the projection of the respective protuberances being substantially equal to the clearance between the shaft element.

6. Phase control means for telescopically related shaft elements comprising in combination an inner shaft element having a plurality of angularly related external faces and an outer tubular shaft element having a plurality of internal faces opposed to said external faces, said elements being in telescopically adjustable association, each of said elements having a protuberance projecting toward the other element and in bearing engagement therewith, said elements having clearance to accommodate the said protuberances when the latter are engaged with angularly related faces, the combined projection of respective protuberances exceeding the clearance between the elements, whereby to preclude the telescopic assembly of the elements with said protuberances in the same plane.

References Cited in the file of this patent

UNITED STATES PATENTS 2,161,138     Cutting _____ June 6, 1939